United States Patent
Nihommori et al.

(10) Patent No.: US 6,635,863 B1
(45) Date of Patent: Oct. 21, 2003

(54) OPTICAL ENCODER

(75) Inventors: Shingo Nihommori, Kawasaki (JP); Seiji Sakagami, Kawasaki (JP); Toru Yaku, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 68 days.

(21) Appl. No.: 09/626,923

(22) Filed: Jul. 27, 2000

(30) Foreign Application Priority Data

Aug. 6, 1999 (JP) .......................................... 11-223296

(51) Int. Cl.$^7$ ................................................ G01D 5/34
(52) U.S. Cl. ............................ 250/231.13; 250/237 G; 250/237 R
(58) Field of Search ..................... 250/231.13, 231.14, 250/231.16, 237 R, 237 G; 341/9, 11, 13

(56) References Cited

U.S. PATENT DOCUMENTS

| | | | |
|---|---|---|---|
| 4,518,859 A | | 5/1985 | Hoshika |
| 4,680,466 A | * | 7/1987 | Kuwahara et al. ...... 250/231.14 |
| 5,073,710 A | * | 12/1991 | Takagi et al. .......... 250/231.14 |
| 5,479,010 A | * | 12/1995 | Shimomura et al. ... 250/231.13 |
| 5,748,373 A | * | 5/1998 | Hane et al. ................. 359/575 |
| 5,886,352 A | | 3/1999 | Wright et al. |

FOREIGN PATENT DOCUMENTS

| EP | 0 143 525 A1 | * | 6/1985 | ............ G01D/5/36 |
| GB | 909916 | * | 11/1962 | .......... G01D/5/347 |
| GB | 1014756 | | 12/1965 | |
| GB | 2 298 482 A | | 4/1996 | |
| GB | 2298482 | * | 4/1996 | .......... G01D/5/347 |

* cited by examiner

Primary Examiner—Edward J. Glick
Assistant Examiner—Chih-Cheng Glen Kao
(74) Attorney, Agent, or Firm—Oliff & Berridge, PLC

(57) ABSTRACT

An optical encoder comprises a main scale (1) having scale gratings (11) formed thereon with a certain angular pitch along a measurement axis ($x_1$) that describes a circular arc. It also comprises a detection bead (2) having photoreceptive optical gratings (7) formed thereon. The detection head is arranged relatively movable along the measurement axis ($x_1$), opposing to the main scale (1). The photoreceptive optical gratings (7) on the detection head (2) have transparent and opaque portions alternately arranged with a certain distance pitch along a straight, grating arrangement axis ($x_2$).

5 Claims, 9 Drawing Sheets

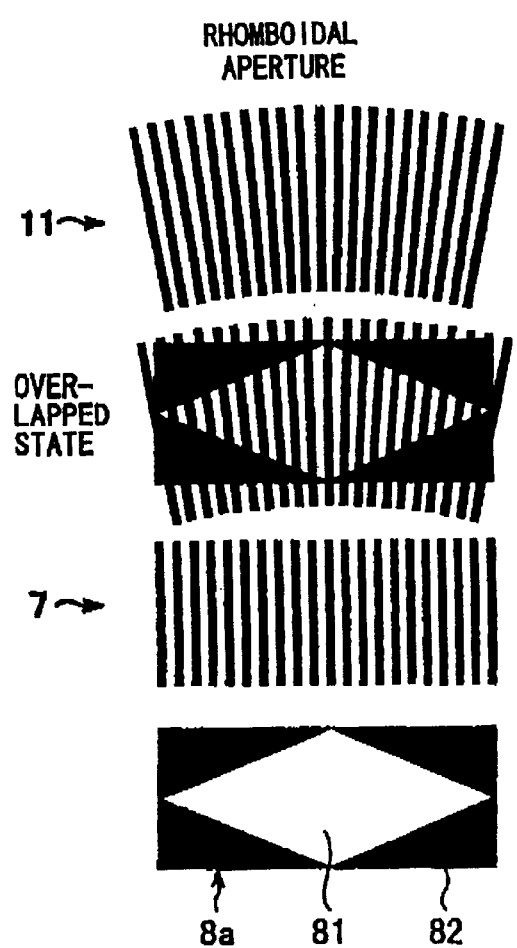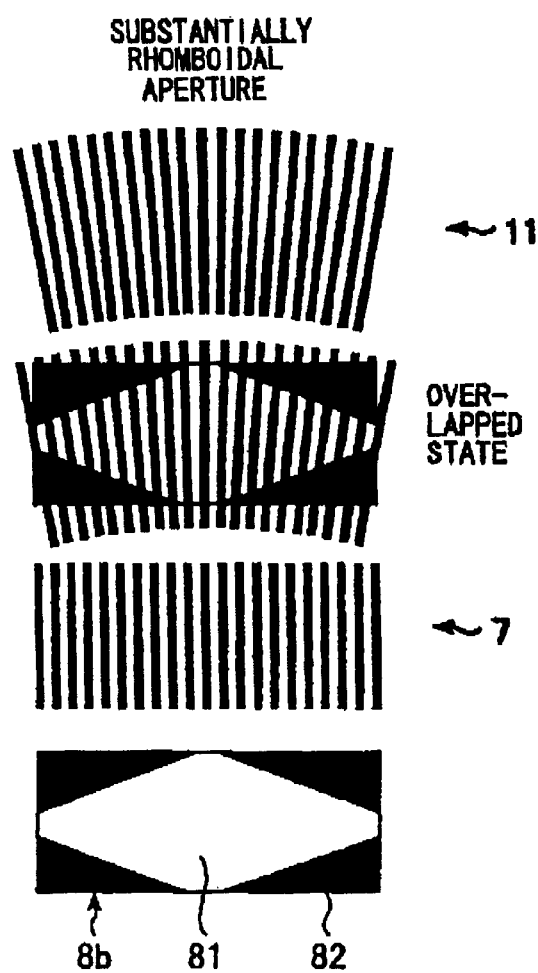
FIG. 5A
FIG. 5B

OPTICAL ENCODER

BACKGROUND OF THE INVENTION

1. Field of the Invention

The present invention relates to an optical encoder.

2. Description of the Related Art

An optical encoder comprises a main scale and a detection head for optically reading the main scale, which are assembled together. On assembling such the optical encoder, attitude adjustments are important to achieve a high performance. Specific attitude adjustments are required for: a gap between the main scale and the detection head; a rotation about each axis between the detection head and the main scale; and an offset in a direction perpendicular to a measurement axis between the detection head and the main scale.

In particular, a small optical encoder has optical gratings formed with a fine pitch and thus disadvantageously requires assembling and attaching with a high precision to achieve a high performance. Mechanical adjustments for attitude variations have been performed in the art but have limitations in mechanical attitude adjustments.

SUMMARY OF THE INVENTION

The present invention has been made in consideration of the above situation and accordingly has an object to provide an optical encoder capable of achieving a high performance without the need for attitude adjustments and assembling with a high precision.

The present invention is provided with an optical encoder, which comprises a main scale having first optical gratings formed thereon with a certain angular pitch along a measurement axis. The measurement axis describes a circular arc. The encoder also comprises a detection head having second optical gratings formed thereon. The detection head is arranged opposing to the main scale and is relatively movable along the measurement axis to detect relative displacement between said main scale and said detection head. The second optical gratings on the detection head are arranged with a certain distance pitch on a straight line.

The present invention is also provided with an optical encoder, which comprises a main scale having first optical gratings formed thereon with a certain distance pitch along a measurement axis. The measurement axis describes a straight line. The encoder also comprises a detection head having a second optical gratings formed thereon. The detection head is arranged opposing to the main scale and is relatively movable along the measurement axis to detect relative displacement between said main scale and said detection head, The second optical gratings on the detection head are arranged with a certain angular pitch on a circular arc.

In the case where the optical encoder of the present invention is a rotary type with a measurement axis that describes a circular arc, the optical gratings on the detection head has a grating arrangement on a straight line. In the case where the optical encoder is a linear type with a measurement axis that describes a straight line, the optical gratings on the detection head has a grating arrangement on a circular arc. According to such the arrangements, the optical gratings on the main scale overlap the optical gratings on the detection head, varying the overlapping state little by little from adjacent one, within a certain length along the measurement axis of the detection head. As a result, even if a misalignment occurs in an attitude of one to another between opposite optical gratings, the misalignment of the attitude less varies the overlapped state of optical gratings, hardly suffering affection from attitude fluctuations.

In the present invention, the two opposite optical are designed respectively in a circular arc arrangement and a straight line arrangement. Therefore, as they are apart from the center of the detection head along the measurement axis, an oblique angle between the two optical gratings increase gradually and an overlapping area between the two optical gratings decreases, resulting in an increase in the DC offset component of the output signal. To improve this situation, it is efficient to restrict an effective photodetective surface of the optical gratings on the detection head within a certain length, along the measurement axis, in which the two optical gratings have almost identical pitches. An aperture may be useful for defining the effective photodetective surface. The aperture is shaped, for example, to have sizes larger at the center of the certain length of the second optical gratings and smaller at peripheries along the measurement axis. Such the aperture can suppress large DC light components produced at both ends of the optical gratings along the measurement axis on the detection head and ensures a sufficiently large ratio of peak-to-peak value $V_{PP}$ to DC offset $V_{DC}$ of the output signal.

In the present invention, the detection head may comprise either: (a) an index scale having the second gratings formed thereon and photodetective devices for receiving lights transmitted through the second gratings; or (b) a photodetective device array that serves as the second gratings.

Other features and advantages of the invention will be apparent from the following description of the preferred embodiments thereof.

BRIEF DESCRIPTION OF THE DRAWINGS

The present invention will be more fully understood from the following detailed description with reference to the accompanying drawings in which:

FIG. 5A illustrates a second embodiment with an aperture combination;

FIG. 5B illustrates a second embodiment with another aperture in combination;

DETAILED DESCRIPTION OF THE PREFERRED EMBODIMENT FIRST EMBODIMENT

Figure 1:
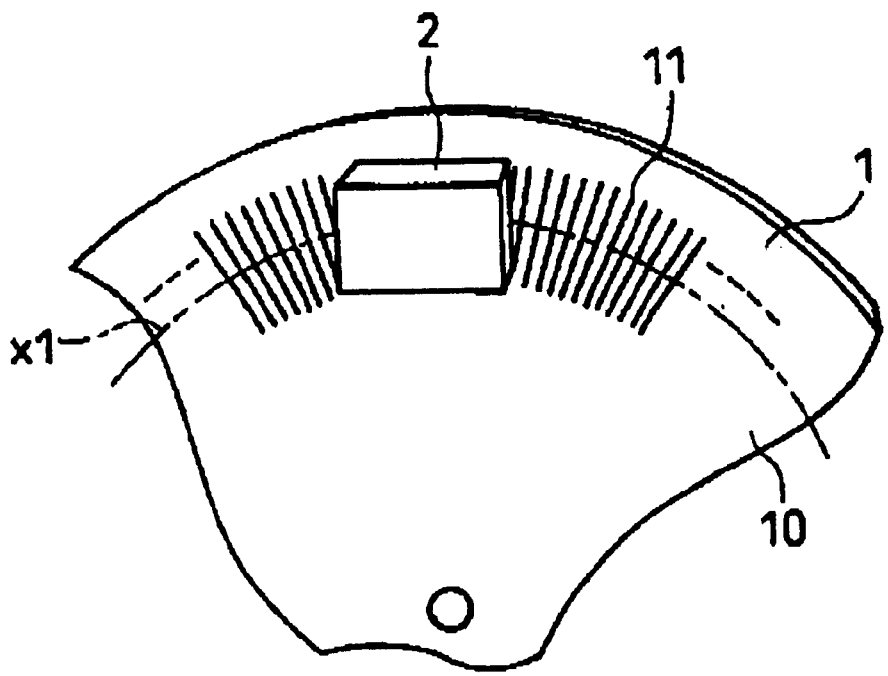
FIG. 1 shows an arrangement of an optical encoder according to a first embodiment of the present invention.

FIG. 1 shows an arrangement of a first embodiment of the present invention, which is application to a rotary encoder. The rotary encoder comprises a main scale 1 and a detection head 2 for reading the scale. The main scale 1 include a scale disk 10 and a set of optical gratings (scale gratings) 11 formed thereon. The scale disk 10 has a measurement axis $x_1$ that describes a circular arc. The optical gratings 11 have reflective and non-reflective portions along the measurement axis $x_1$ with a certain angular pitch (a straight distance of P at the center of the track width).

Figure 2:
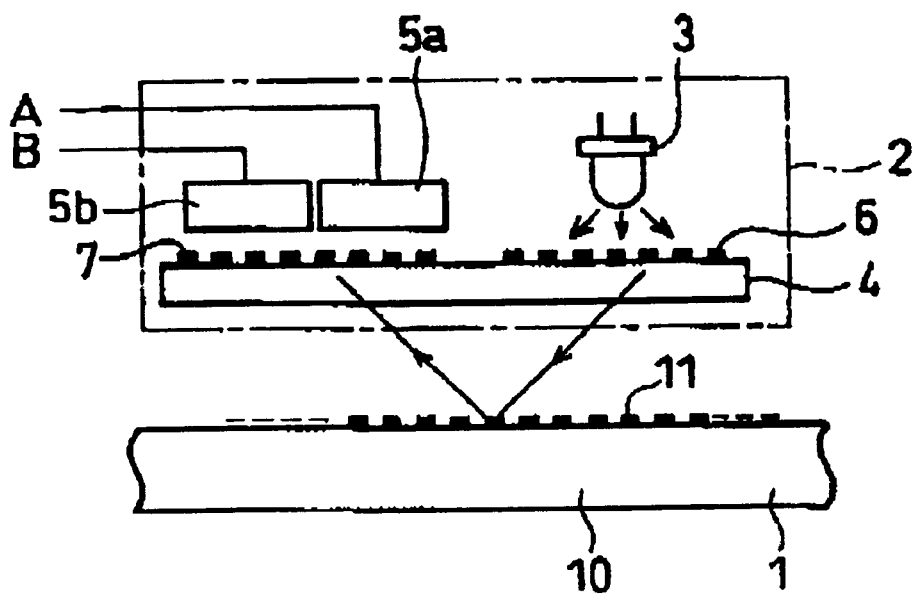
FIG. 2 is a cross sectional view of the optical encoder of the first embodiment.

The detection head 2 includes, as shown in the cross sectional view of FIG. 2, a light source such as an LED 3, an index scale substrate 4, and photodetective devices 5a, 5b. The Index scale substrate 4 includes a set of optical gratings 6 at the light source side, which receives the light from the LED 3 to configure a secondary light source for illuminating the main scale 1. It also includes another set of optical gratings 7 at the photoreceptive side for receiving the light reflected from the main scale 1. The optical gratings 7 at the photoreceptive side are divided into two grating sections A- and B-phase outputs having a phase difference of 90° between them, relative to the angular pitch of the scale grating 11 on the main scale. These grating sections correspond to the photodetective devices 5a and 5b for A- and B-phases.

Figure 3:
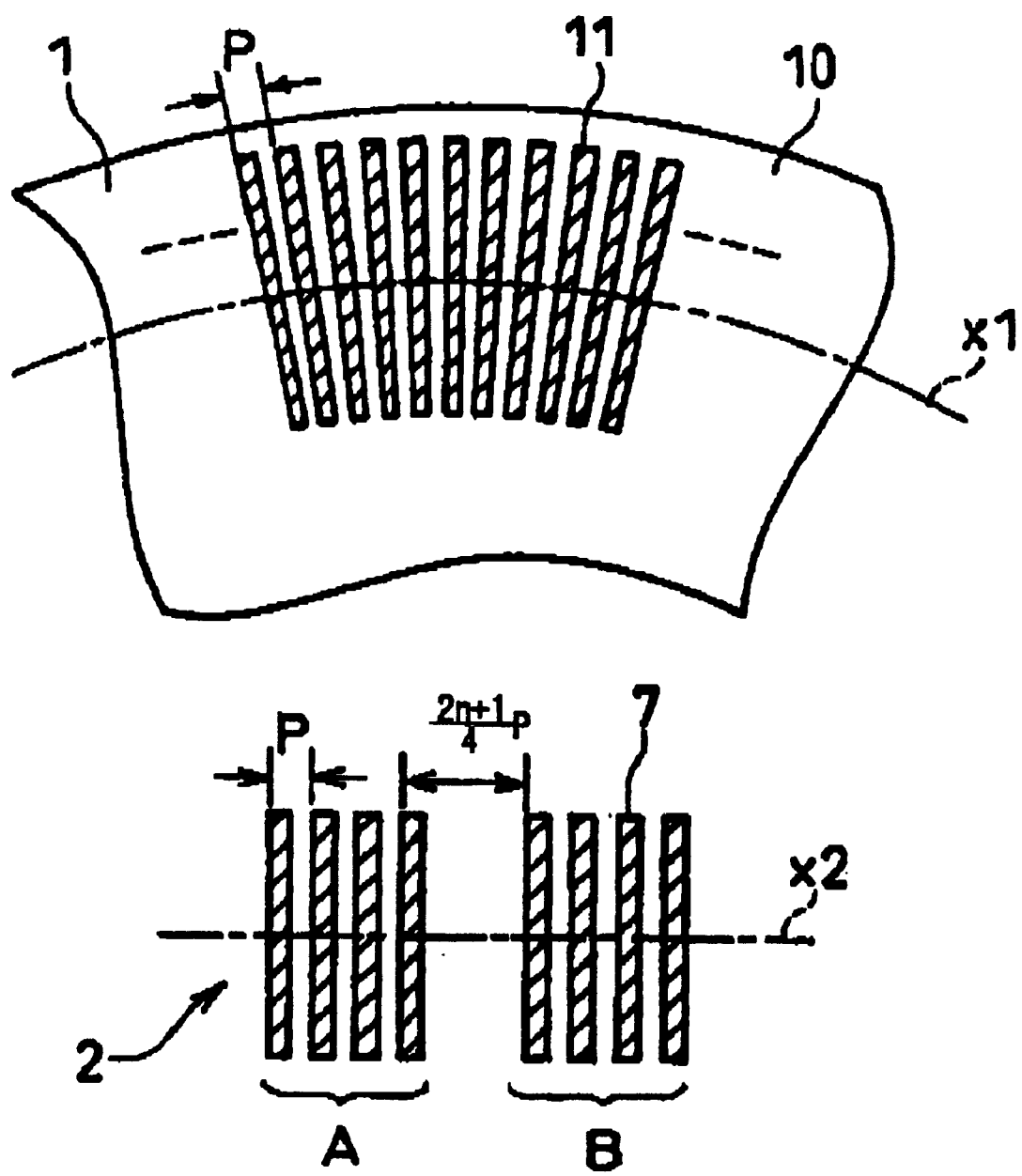
FIG. 3 shows patterns of scale gratings and optical grating at the photoreceptive side of the first embodiment.

FIG. 3 illustrates patterns of the scale gratings 11 on the main scale 1 and the optical gratings 7 at the photoreceptive side on the detection head 2 in a side-by-side manner. The optical gratings 7 at the photoreceptive side on the detection head 2 have a straight, grating arrangement axis $x_2$ while the measurement axis $x_1$ on the main scale 1 describes a circular arc. The optical gratings 7 have transparent and opaque portions along the grating arrangement axis $x_2$ with a pitch of P. The grating sections for A-phase output and the grating section for B-phase output are arranged along the grating arrangement axis $x_2$ with a phase difference of $(2n+1)P/4$ (n denotes an integer).

In the above embodiment, a pair of opposite gratings, between the optical grating 7 at the photoreceptive side on the detection head 2 and the scale gratings 11 on the main scale 1, has an overlapped area that is largest at the center of a certain length along the measurement axis within the optical gratings 7. The overlapping area gradually decreases as it closes to both edges because an oblique angle between the opposite gratings increases. This variation in the overlapped areas of gratings along the measurement axis reduces the output fluctuation due to the attitude fluctuation between the detection head 2 and the main scale 1.

Figure 4A:
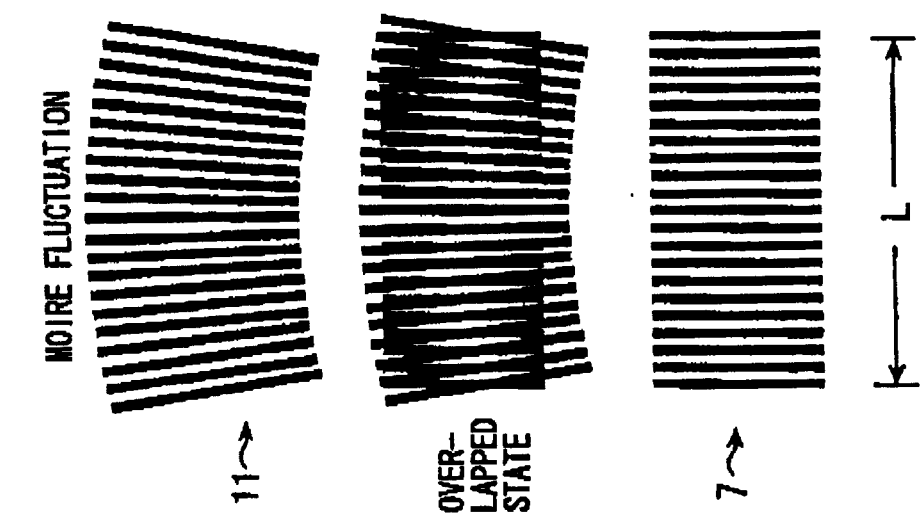
FIG. 4A shows an overlapping state of optical gratings when the optical encoder of the first embodiment is in a state of the best alignment.
Figure 4B:
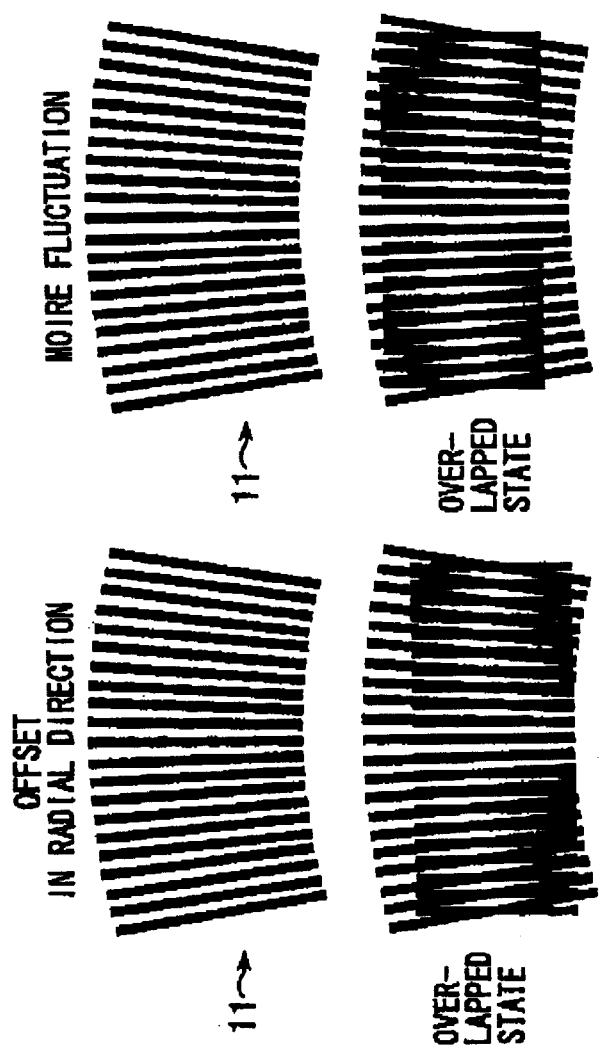
FIG. 4B shows an overlapping state of optical gratings after an attitude variation occurred in the optical encoder of the first embodiment.
Figure 4C:
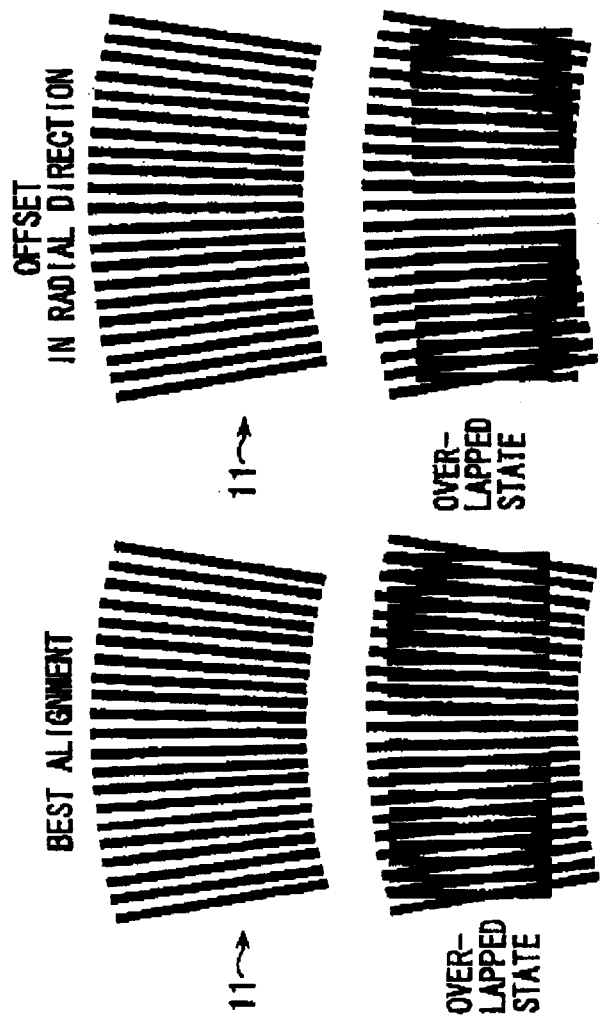
FIG. 4C shows an overlapping state of optical gratings after another attitude variation occurred in the optical encoder of the first embodiment.

FIGS. 4A–C show variations in overlapped states of gratings, between the optical gratings 7 at the photoreceptive side on the detection head 2 and the scale gratings 11 on the main scale 1, which occur based on their relative attitudes. FIG. 4A shows a case in the best alignment as designed; FIG. 4B another case with an offset occurred in the radial direction; and FIG. 4C a different case with a rotational variation (moire variation) occurred. As obvious from FIG. 4A, even in the best alignment, within a length L along the measurement axis on the optical graftings 7, the overlapped area of gratings is larger at the center and gradually becomes smaller as closing to peripheries. Therefore, an average of total overlapped areas in the entire optical gratings 7 hardly changes greatly even if attitude fluctuation occur as shown in FIGS. 4B–C.

Accordingly, the detection head in this embodiment has a slow response to the attitude fluctuations, thereby affording a high performance to the encoder without precise assembling and attitude adjustment.

SECOND EMBODIMENT

As obvious from FIG. 4, in the above embodiment, a signal with larger amplitude can be obtained from the center of the optical gratings 7 at the photoreceptive side. In contrasts, the signal light has a large DC light component at peripheries because the overlapped area between opposite gratings decreases as the oblique angle between them increase. To eliminate this problem, in a preferred, second embodiment, an aperture is provided to restrict the optical gratings 7 at the photoreceptive side on the detection head 2 to have an effective photodetective surface within a length L along the measurement axis. The effective photodetective surface is defined as a region in which the angular pitch of the scale gratings 11 and the distance pitch of the optical gratings 7 are substantially equal to each other. The aperture is shaped so as to allow the effective photodetective surface to have sizes of a track width larger at the center and smaller at peripheries within the length L.

FIG. 5A shows an aperture 8a and a state of masking an overlapped pattern between the optical gratings 7 and the scale gratings 11 using the aperture 8a. FIG. 5B shows another aperture 8b and a state of masking an overlapped pattern between the optical gratings 7 and the scale gratings 11 using the aperture 8b. The aperture 8a includes a masking material 82 having a size enough to cover the entire optical gratings 7 and a rhomboidal window 81 opened therein. The aperture 8b includes a masking material 82 having a size enough to cover the entire optical gratings 7 and a substantially rhomboidal window 81 opened therein.

The aperture 8b and 8b are formed, specifically in FIG. 2, on the surface of the optical gratings 7 of the index scale substrate 4 or on photodetective surfaces of the photodetective devices 5a and 5b. Alternatively, they may be formed on the surface of the index scale substrate 4 opposite to the surface used for forming the optical gratings 7 at the photodetective side. Otherwise, the apertures 8a and 8b may be formed integrally with the optical gratings 7 at the photoreceptive side using the same metallic film for patterning them simultaneously.

The use of such the aperture in combination, while it restricts the amplitude of the output signal 4, can suppress useless DC light components and ensures a sufficiently large ratio of peak-to-peak value $V_{PP}$ to DC offset $V_{DC}$ of the output signal.

THIRD EMBODIMENT

Figure 6:
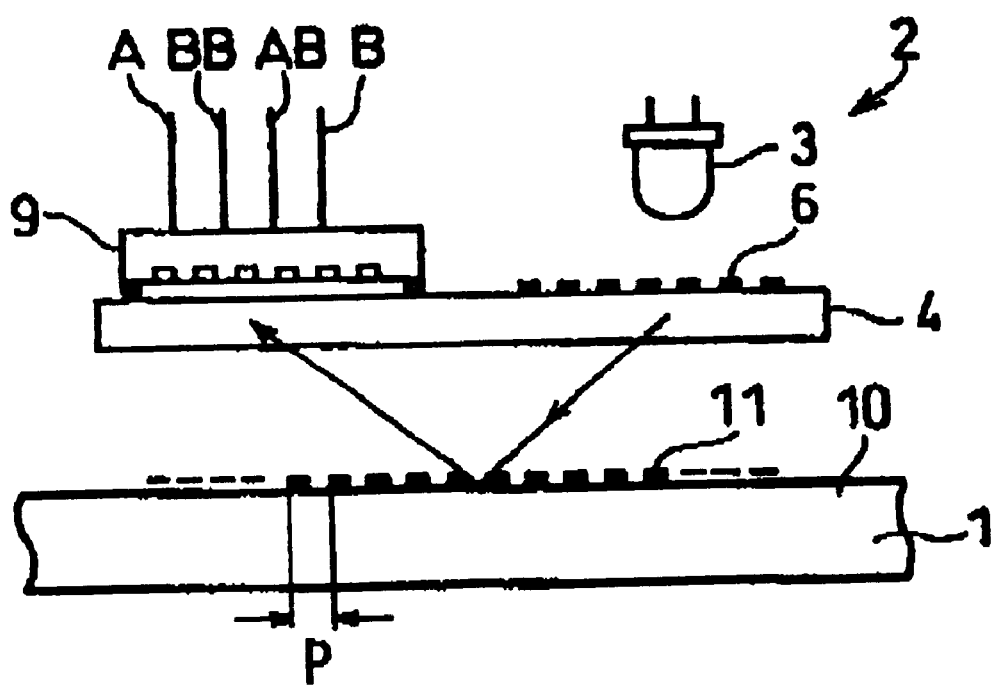
FIG. 6 is a cross sectional view showing a third embodiment with a photodetective device array.

FIG. 6 shows, corresponding to FIG. 2, an arrangement of an encoder according to another embodiment. Other parts are assumed similar to those of the preceding embodiments.

A photodetective device array 9 serving as the optical gratings 7 is employed in this embodiment instead of the use of the optical gratings 7 for configuring the photodetective section of the detection head 2 along with the photodetective devices 5 in the preceding embodiments. The photodetective device array 9 includes photodetective devices such as photodiodes arrayed with a pitch of 3P/4, where P is a pitch of the gratings on the main scale 1. Thus, the photodetective device array 9 is possible to output quadrature-phase displacement signals A(=0°), BB(=270°) AB(=90°), and B(=180°).

FOURTH EMBODIMENT

Figure 7:
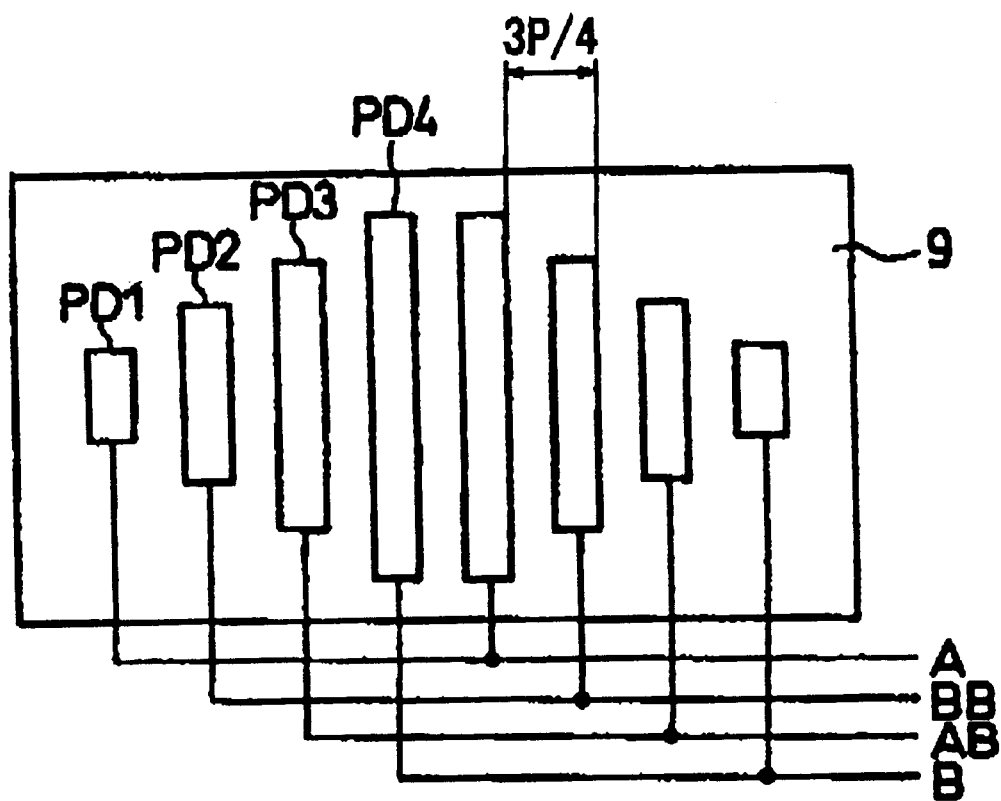
FIG. 7 shows an arrangement of a photodetective device array in an optical encoder according to a fourth embodiment of the present invention.

FIG. 7 shows a preferred array pattern for the photodetective device array 9 in the third embodiment illustrated in FIG. 6. The photodetective device array 9 includes, as depicted, photodetective devices PD1, PD2, PD3, . . . , which have slightly different lengths from adjacent one for forming a substantially rhomboidal layout envelope. This is equivalent to a combination of the aperture described in the second embodiment with a conventional photodetective device array.

This makes it possible to eliminate processes for forming an aperture and, similar to the case with the use of the aperture, can ensure a sufficiently large ratio of peak-to-peak value $V_{PP}$ to the DC offset $V_{DC}$ of output signal.

FIFTH EMBODIMENT

The present invention can also be applied to transmissible encoders whereas reflective encoders are exemplified in the preceding embodiments of the present invention.

Figure 8:
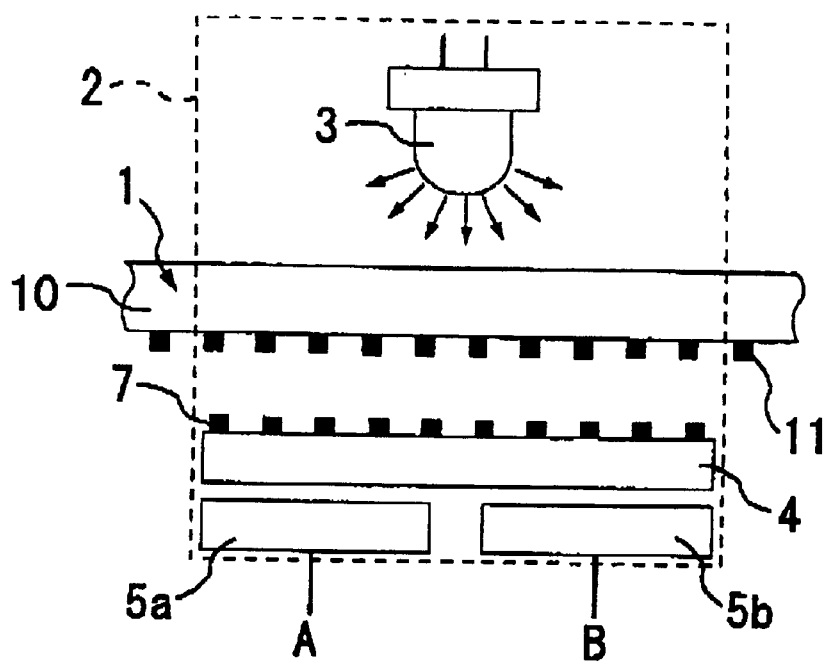
FIG. 8 is a cross sectional view showing an optical encoder according to a fifth embodiment of the present invention.

FIG. 8 shows an arrangement of a transmissible encoder of an embodiment, which is an application of the arrangement of the optical encoder according to the first embodiment shown in FIG. 2, and employs the same reference number for the corresponding parts as the preceding embodiments.

The transmissible encoder according to the present embodiment comprises a main scale 1 and a detection head 2 for reading the main scale 1. The main scale 1 includes a scale disk 10 consisting of a transparent, for example, glass substrate, and optical gratings of transmissible type having transparent and opaque portions alternately arrayed thereon. The detection head 2 includes an LED 3 as a light source, an index scale substrate 4, and photodetective devices 5a, 5b. The index scale substrate 4 and photodetective devices 5a, 5b have the same configuration as those in the first embodiment.

In the present embodiment, the LED 3 is arranged opposing to one surface of the main scale 1. By contrast, the photodetective devices 5a and 5b are arranged opposing to the other surface of the main scale 1 via the index scale substrate 4.

A Light emitted from the LED 3 transmit through the transparent portions of the scald gratings 11 formed on the main scale 1. The light transmitted through the main scale 1 reaches the photodetective devices 5a and 5b after passing through the optical gratings 7 of the index scale substrate 4.

As a result, bi-phase signals A and B, depending on a displacement of the main scale 1 relative to the detection head 2, are obtained.

If an opaque material is utilized for the disk 10, formation of the scale gratings 11 as slits that passes though the scale disk 10 can realize the main scale 1 possibly applied to transmissible encoder.

SIXTH EMBODIMENT

Figure 9:
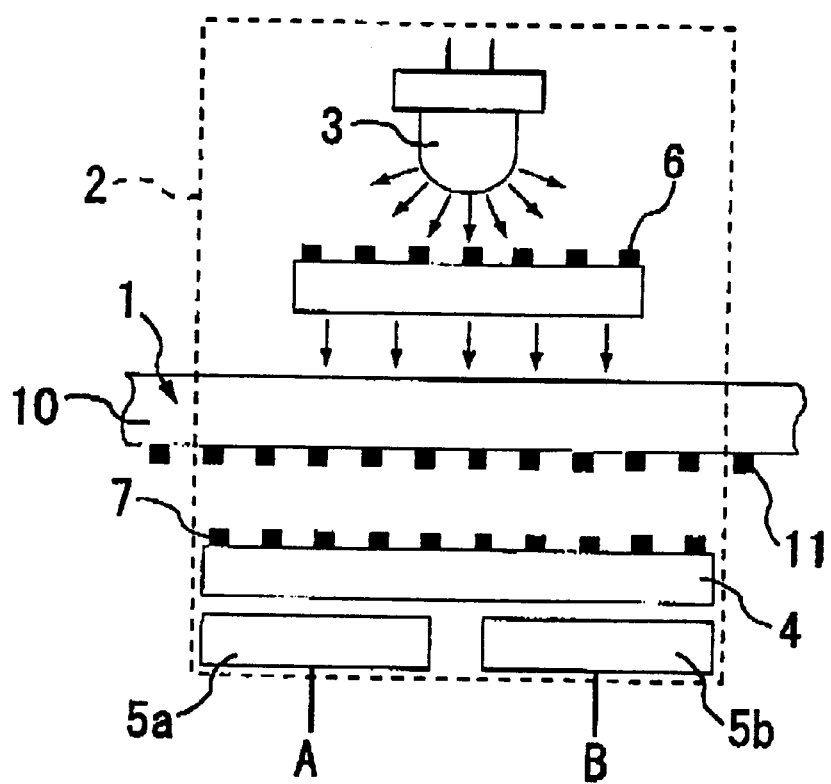
FIG. 9 is a cross sectional view showing an optical encoder according to a sixth embodiment of the present invention.

FIG. 9 shows an arrangement of a transmissible encoder of an embodiment, which is an application of the arrangement of the optical encoder according to the fifth embodiment shown in FIG. 8, and employs the same reference numerals for the corresponding parts as the preceding embodiments.

The transmissible encoder according to the present embodiment comprises a main scale 1 and a detection head 2 for reading the main scale 1. The main scale 1 includes a scale disk 10 consisting of a transparent, for example, glass substrate, and optical gratings of transmissible type having transparent and opaque portions alternately arrayed thereon. The detection head 2 includes an LED 3 as a light source, an index scale substrate 4, optical gratings 6 at the light source side, and photodetective devices 5a, 5b. The index scale substrate 4 and photodetective devices 5a, 5b have the same configurations as those in the fist embodiment.

In the present embodiment, the LED 3 is arranged opposing to one surface of the main scale 1 via the optical gratings 6 at the light source side. By contrast, the photodetective device 5a and 5b are arranged opposing to the other surface of the main scale 1 via the index scale substrate 4.

A Light emitted from the LED 3 is converted, through the optical gratings 6 at the light source side, into a secondary light source for illuminating the scale uniformly, and transmits through the transparent portions of the scale gratings 11 formed on the main scale 1. The light transmitted through the main scale 1 reaches the photodetective devices 5a and 5b after passing through the optical gratings 7 at the photoreceptive side of the index scale substrate 4.

As a result, bi-phase signals A and B, depending on a displacement of the main scale 1 relative to the detection head 2, are obtained.

If an opaque material is utilized for the scale disk 10, formation of the scale gratings 11 as slits that pass through the scale disk 10 can realize the main scale 1 possibly applied to the transmissible encoder.

SEVENTH EMBODIMENT

Figure 10:
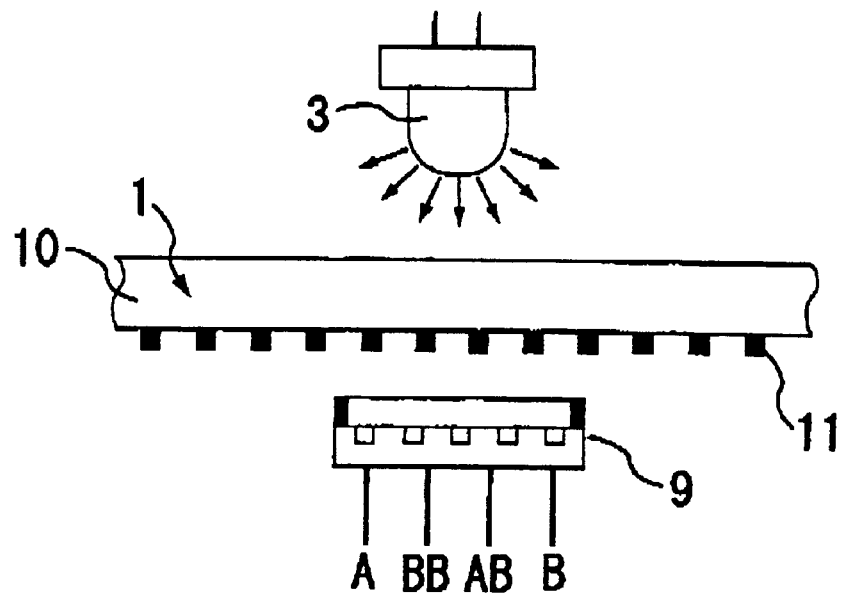
FIG. 10 is a cross sectional view showing an optical encoder according to a seventh embodiment of the present invention.

FIG. 10 shows an embodiment of a transmissible encoder, which is an application of the third embodiment using the photodetective device array 9 as exemplified in FIG. 6, and has the same reference numerals for the corresponding parts as the preceding embodiments.

The transmissible encoder according to the present embodiment comprises a main scale 1, a photodetective device array 9, and an LED 3 as a light source. The main scale 1 has the same configuration as that in the fifth embodiment. The photodetective device array 9 serves as the optical grating at the photoreceptive side similar to the configuration in the third embodiment.

In the present embodiment, the LED 3 is arranged opposing to one surface of the main scale 1. By contrast, the photodetective device array 9 is arranged opposing to the other surface of the main scale 1.

A Light emitted from the LED 3 transmits the transparent portions of the scale gratings 11 formed on the main scale 1, similar to the fifth embodiment. When the light transmitted through the main scale 1 reaches the photodetective device array 9, it outputs quadrature-phase displacement signals A, BB, AB and B based on a displacement of the main scale 1 relative to tho photodetective device array 9.

EIGHTH EMBODIMENT

Figure 11:
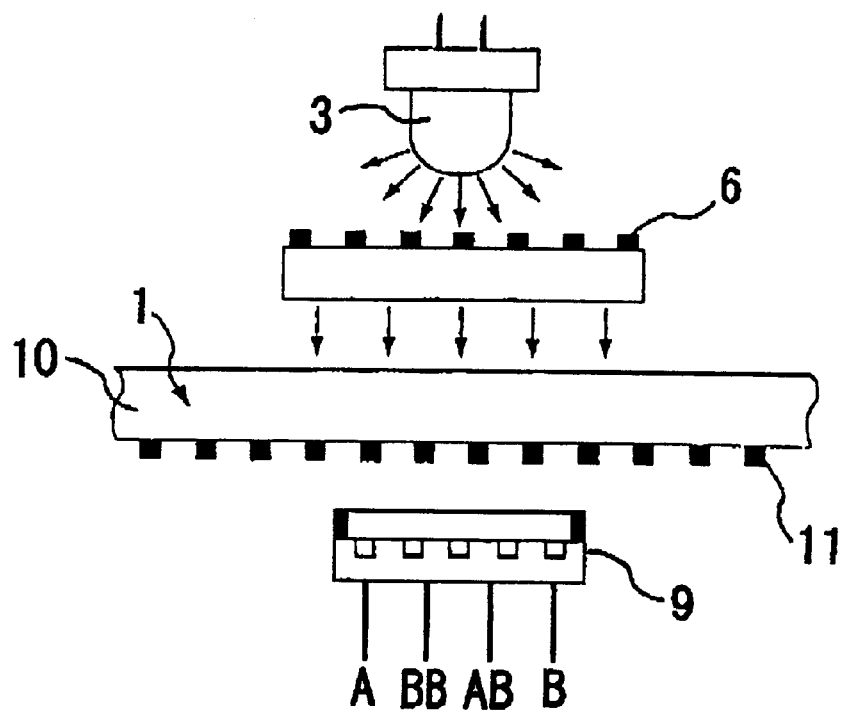
FIG. 11 is a cross sectional view showing an optical encoder according to a eighth embodiment of the present invention.

FIG. 11 shows an embodiment of a transmissible encoder, which is an application of the seventh embodiment as exemplified in FIG. 10, and has the same reference numerals for the corresponding parts as the preceding embodiments.

The transmissible encoder according to the present embodiment comprise a main scale 1, a photodetective device array 9, an LED 3 as a light source and optical gratings 6 at the light source side for forming a secondary light source. The main scale 1 has the same configuration as that in the fifth embodiment. The photodetective device array 9 serves as the optical gratings at the photoreceptive side similar to the configuration in the third embodiment.

In the present embodiment, the LED 3 is arranged, through opposing to one surface of the main scale 1 via the optical gratings 6 at the light source side. In addition, the photodetective device array 9 is arranged opposing to the other surface of the main scale 1.

A Light emitted from the LED 3 is converted, through the optical gratings 6 at the light source side, into a secondary light source for illuminating the scale uniformly, and transmits the transparent portions of the scale gratings 11 formed on the main scale 1, similar to the fifth embodiment. When the light transmitted through the main scale 1 reaches the photodetective device array 9, it outputs quadrature-phase displacement signals A, BB, AB and B based on a displacement of the main scale 1 relative to the photodetective device array 9.

NINTH EMBODIMENT

Although applications to the rotary encoder were described above with respect to the preceding embodiments, the arrangement of the preceding embodiments can be also applied to a linear encoder.

Figure 12:
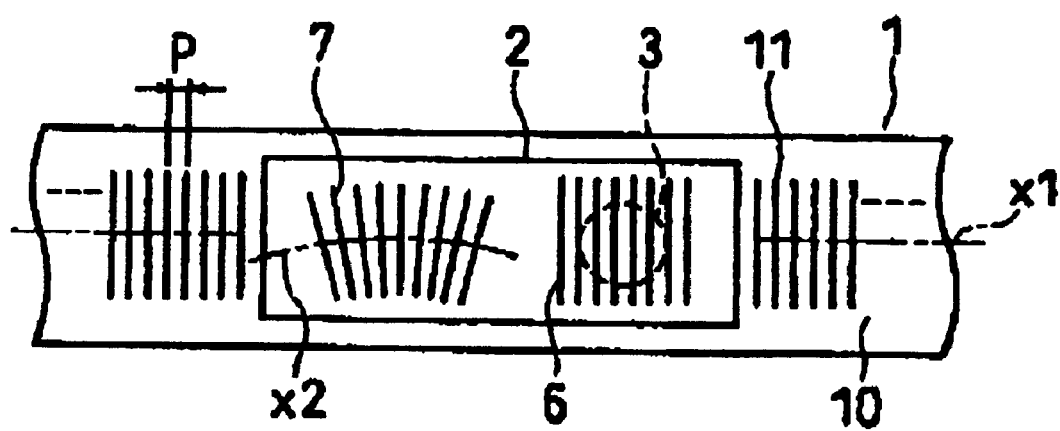
FIG. 12 shows an arrangement of an optical encoder according to a ninth embodiment of the present invention.

FIG. 12 shows an arrangement of an embodiment, which is an application of the present invention to a linear encoder, and has the same reference numerals for the corresponding parts as the preceding embodiments. In the present embodiment, the main scale 1 has a straight measurement axis $x_1$. The scale gratings 11 arranged along the measurement axis $x_1$ with a certain distance pitch of P. The optical gratings 7 at the photoreceptive side on the detection head 2 have transparent and opaque portions alternately arranged with a certain angular pitch (a straight distance of P at the center of the track) a grating arrangement axis $x_2$ that desires a circular arc.

An overlapped state of opposite gratings, between the scale gratings 11 on the main scale 1 and the gratings 7 at the photodetective side on the detection head 2, is the same as that in FIG. 4, except that the optical gratings 7 and the detection head 2 are configured inversely, compared to the relation in FIG. 4. Therefore, a insensitive response to the attitude fluctuation can be effected, similar to the first embodiment. In addition, the use of an aperture in combination in the fifth embodiment may also be effective like in the second embodiment. A photodetective device array sing as the gratings 7 at the photoreceptive side may also be employed similar to the third and fourth embodiments.

As obvious from the forgoing, with the use of the optical grating arrayed along a straight line and the optical gratings arrayed along a circular arc in combination, the present invention can provide an optical encoder capable of reducing influence from assembled errors and attitude fluctuations after assembling, and of achieving a high performance without the need for attitude adjustments and assembling with a high precision.

Having described the embodiments consistent with the present invention, other embodiments and variations consistent with the present invention will be apparent to those skilled in the art. Therefore, the invention should not be viewed as limited to the disclosed embodiments but rather should be viewed a limited only by the spirit and scope of the appended claims.

What is claimed is:

1. An optical encoder, comprising:

a main scale having first optical gratings formed thereon with angular pitch P along a measurement axis, said measurement axis describing a circular arc;

a detection head having photodetective device arrays which are formed thereon and serve as second optical gratings, said detection head being arranged opposing to said main scale and relatively movable along said measurement axis to detect relative displacement between said main scale and said detection head, wherein said second optical gratings are arranged with distance pitch P on a straight line and the photodetective device arrays are arranged with a phase difference of $(2n+1)P/4$ (n: an integer); and an aperture for defining said photodetective device arrays so that an effective photodetective surface of said photodetective device arrays have sizes of a track width larger at the center and smaller at peripheries.

2. The optical encoder according to claim 1, wherein said photodetective device array are shaped into a rhombus.

3. An optical encoder, comprising:

a main scale having first optical gratings formed thereon with distance pitch P along a measurement axis, said measurement axis describing a straight line;

a detection head having photodetective device arrays which are formed thereon and serve as second optical gratings, said detection head being arranged opposing to said main scale and relatively movable along said measurement axis to detect relative displacement between said main scale and said detection head, wherein said second optical gratings on said detection head are arranged with angular pitch P on a circular arc and the photodetective device arrays are arranged with a phase difference of $(2n+1)P/4$ (n: an integer); and an aperture for defining said photodetective device arrays so that an effective photodetective surface of said photodetective device arrays have sizes of a track width larger at the center and smaller at peripheries.

4. The optical encoder according to claim 1, wherein said photodetective device array on said detection head are shaped into a rhombus.

5. An optical encoder, comprising:

a main scale having first optical gratings formed thereon with angular pitch P along a measurement axis, said measurement axis describing a circular arc;

a detection head having photodetective device arrays which are formed thereon and serve as second optical gratings, said detection head being arranged opposing to said main scale and relatively movable along said measurement axis to detect relative displacement between said main scale and said detection head, wherein said photodetective device arrays on said detection head are arranged on a straight line with a phase difference of $(2n+1)P/4$ (n: an integer), where P is also the distance pitch between second optical gratings; and an aperture for defining said photodetective device arrays so that an effective photodetective surface of said photodetective device arrays have sizes of a track width larger at the center and smaller at peripheries.

* * * * *